US012562524B2

(12) United States Patent
Metzler et al.

(10) Patent No.: US 12,562,524 B2
(45) Date of Patent: Feb. 24, 2026

(54) INTERNALLY SEALED PLUG CONNECTOR

(71) Applicant: HIRSCHMANN AUTOMOTIVE GMBH, Brederis (AT)

(72) Inventors: Andreas Metzler, Muntlix (AT); Markus Kalb, Dornbirn (AT); Marvin Wolf, Feldkirch (AT)

(73) Assignee: Hirschmann Automotive GmbH, Rankweil/Brederis (AT)

( * ) Notice: Subject to any disclaimer, the term of this patent is extended or adjusted under 35 U.S.C. 154(b) by 197 days.

(21) Appl. No.: 18/281,509

(22) PCT Filed: Jun. 9, 2022

(86) PCT No.: PCT/EP2022/065667

§ 371 (c)(1),
(2) Date: Sep. 11, 2023

(87) PCT Pub. No.: WO2022/258744

PCT Pub. Date: Dec. 15, 2022

(65) Prior Publication Data

US 2024/0170886 A1 May 23, 2024

(30) Foreign Application Priority Data

Jun. 11, 2021 (DE) ..................... 10 2021 115 134.1

(51) Int. Cl.
*H01R 13/52* (2006.01)
*H01R 43/20* (2006.01)

(52) U.S. Cl.
CPC ........... *H01R 13/521* (2013.01); *H01R 43/20* (2013.01)

(58) Field of Classification Search
None
See application file for complete search history.

(56) References Cited

U.S. PATENT DOCUMENTS

| | | | | |
|---|---|---|---|---|
| 5,211,586 | A | 5/1993 | Maue | |
| 5,580,264 | A | 12/1996 | Aoyama | |
| 5,593,320 | A | 1/1997 | Konda | |
| 9,318,841 | B2 | 4/2016 | Gimbel | |
| 2012/0003860 | A1 * | 1/2012 | Gossen | H01R 13/5812 439/460 |
| 2012/0142206 | A1 * | 6/2012 | Buehman | H01R 13/5221 29/857 |
| 2019/0157797 | A1 * | 5/2019 | McDowell | H01R 13/506 |
| 2020/0112120 | A1 * | 4/2020 | Koyama | H01R 13/5202 |

FOREIGN PATENT DOCUMENTS

JP H0660069 U 8/1994

* cited by examiner

*Primary Examiner* — Oscar C Jimenez
(74) *Attorney, Agent, or Firm* — Harness, Dickey & Pierce, P.L.C.; Anthony G. Fussner

(57) ABSTRACT

The invention relates to a plug connection, comprising at least one pin contact (2) and/or at least one socket contact, which is connected to a cable and to a pin housing (3) or socket housing, wherein: the pin contacts (2) or socket contacts are scaled in the pin housing (3) or socket housing and are fastened to prevent longitudinal movement; each pin contact (2) or socket contact is assigned a scaling element (1), which surrounds the pin contact (2) or socket contact in question; each sealing element (1) is inserted in a recess of the pin housing (3) or socket housing; and the scaling elements (1) can be braced.

18 Claims, 1 Drawing Sheet

INTERNALLY SEALED PLUG CONNECTOR

CROSS REFERENCE TO RELATED APPLICATIONS

This application is the US-national stage of PCT application PCT/EP2022/065667 filed 9 Jun. 2022 and claiming the priority of German patent application 102021115134.1 itself filed 11 Jun. 2021.

The invention relates to a plug connector with at least one contact pin and/or with at least one contact socket connected to a cable and to a pin or socket housing, the pin or contact sockets being sealed in the pin or socket housing and secured against longitudinal displacement, according to the features of the preamble of patent claim 1.

It is known that plug connectors are provided at one end of a cable and have at least one electrical conductor. A contact (called contact element or pin or contact socket) is provided on each electrical conductor, and each contact is in a housing, also referred to as a pin or socket housing, is in particular provided in a respective chamber of the housing.

In practice, such plug connectors are subject to external influences, such as temperature fluctuations, contamination, but also moisture or water or the like.

It is also known that the housing, pin or socket housing has a receptacle into which a seal is inserted, this seal is on the outer jacket of the cable, so that this jacket is sealed with respect to the housing and no water can penetrate into the respective chambers of the housing. In this case, however, it is difficult to coordinate the materials involved (jacket, seal, housing), to ensure permanent longitudinal water tightness.

DE 10 201 1 051 291 [U.S. Pat. No. 9,318,841] also describes a plug connector that has an inserted, uncompressed seal block and clamping attachments for the contacts or the cable. Neither the sealing block nor the clamping attachments are satisfactory for their task.

The object of the invention is therefore to provide a plug connector that is satisfactory with respect to water tightness. It is thus intended to prevent moisture, water or the like from penetrating into the housing of the plug connector via the cable and passing thence to a contact. This object is achieved by the features of claim 1.

According to the invention, a seal is associated with each pin or contact socket and surrounds the pin or contact sockets, that each compression element is inserted in a chamber of the pin or socket housing, and the seals are designed such that they can be compressed. This ensures that the pin or contact sockets are clearly and securely sealed in the pin or socket housing and thus a permanent tightness is ensured. The pin or contact sockets are reduced in cross-section in the region of the seals, so that the seals are fixed in a complementary manner from the start to the pin or contact sockets.

In a further embodiment of the invention, it is proposed that a compression element is fixed in the pin or socket housing, which compression element has compression heads compressing the seals. This compression element therefore ensures that a firm permanent compression of the seals is provided.

In order to simplify the assembly, it is proposed that the compression element be of semicylindrically shell-shaped design and the pin or contact sockets can be fitted into them. This semicylindrically shell-shaped configuration of the compression element is sufficient and ensures a secure clamping of the seals. The compression element can also be improved in that two semicylindrically shell-shaped compression elements or a solid-body compression element are provided that engage around the pin or contact sockets, so that the seals are pressed against their entire end faces.

In order to fix the compression element or compression elements, a latch element is provided that is supported on the pin or socket housing, so that a permanent compression of the seals is provided. The latch element is preferably designed as comb and has teeth that can be inserted into openings of the pin or socket housing and of the latch element. The compression element or elements are thereby firmly supported on the pin or socket housing.

In order to produce the longitudinal securing of the pin or contact sockets in the pin or socket housing, it is proposed that the pin or contact sockets have lateral projections that can be supported on the teeth. In this case, the compression element has recesses complementary to the lateral projections and in which the projections are arranged and fitted, so that the pin and contact sockets are braced in both directions for insertion and removal of the plug connectors.

In a further discussion of the invention, reference is made to the drawing in which an embodiment of the invention is illustrated in a simplified manner. Therein:

Figure 1:
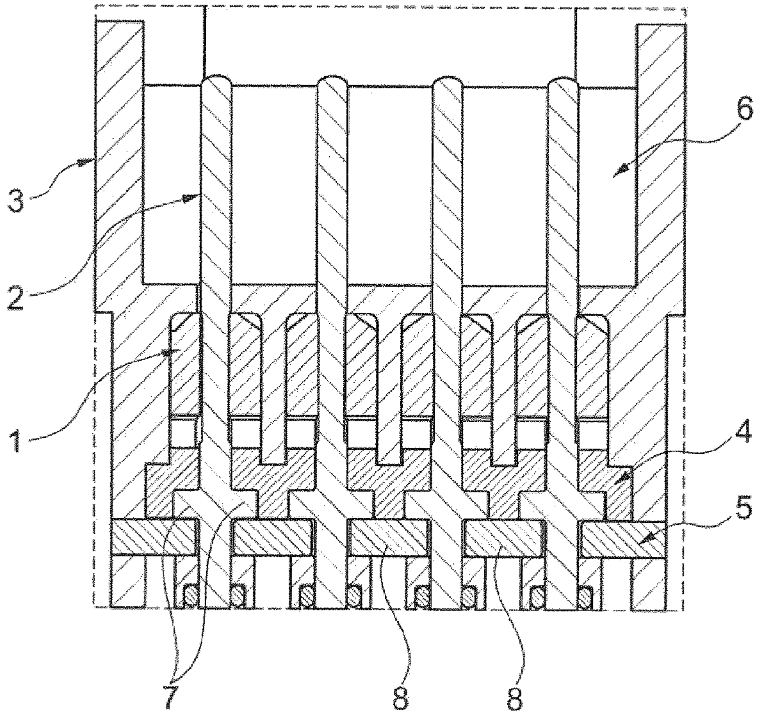
FIG. 1 is a top-view section through a plug connector.
Figure 2:
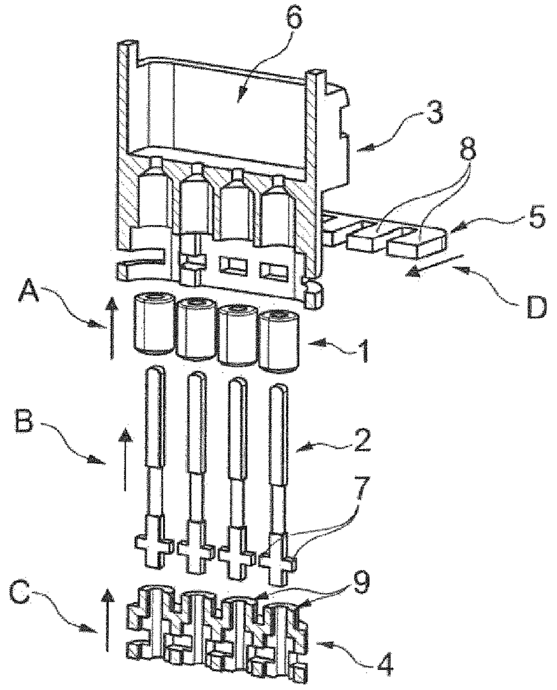
FIG. 2 is an exploded view of the individual components of one connector prior to assembly.

In FIGS. 1 and 2, as far as shown in detail, reference numeral 1 denotes seals provided for each contact pin 2 and inserted into complementary chambers of a pin housing 3. The seals 1 are approximately cylindrical and made of an elastically yielding or deformable material. The contact pins 2 fit through passages of the seals 1. Contact sockets and a socket housing can of course also be used.

In the embodiment according to FIG. 1, the seals 1 have a compression element 4 that pushes the seals 1 into the chambers with compression heads 9, while axially compressing them so they expand radially and fit snugly. Due to the elastic deformability of the seals 1, they conform to the shape of the inner surface of the chamberes in the pin housing 3 and the outer surfaces of the contact pins 2. As can be seen in FIG. 1, the compressed seals 1 each conform around a part of a respective one of the contact pins 2 and do not interact with the electrical conductor, its jacket or a jacket of such a cable.

As shown in FIG. 2, the compression element 4 is a semicylindrical shell and has depressions with which it at least partially surrounds the contact pins 2. Two semicylindrically shell-shaped compression elements 4 or a single compression element 4 that completely surrounds the contact pins 2, can also be used. Furthermore, the contact pins 2 have short transverse projections 7 aligned longitudinally of the compression element 4 and transversely to the longitudinal axis of the contact pins 2 and insertable into further depressions of the compression element 4. The compression element 4 is fixed in the pin housing 3 by a latch element 5, these latch element 5 having teeth 8 fitted into openings of the pin housing 3 and of the latch element 5 so that the latch element 5 is fixed in the pin housing 3. As a result, the contact pins 2 are simultaneously fixed in both axial directions on the compression element 4 and latch element 5, on the teeth 8 thereof.

In the pin housing 3, as shown in FIG. 2, the seals 1 are first inserted into the respective chamberes in the direction A and fixed there. Subsequently, insertion of the contact pins 2 takes place in a step B. Thereafter, in a step C, the compression element 4 is fitted into the pin housing 3 of the plug connector, whereby the seals 1 are engaged or compressed by insertion of the compression element 4. This is done under the action of force so that the force for compression is maintained.

Subsequently, the latch element 5 is inserted into the pin housing 3 and thus fixes the compression element 4 in the pin housing 3 so that the force of the compression element 4 on the seals 1 is thereby maintained in the sense of a permanent compression.

In FIGS. 1 and 2, the pin housing 3, which can also be designed as a socket housing in that at least the pin housing 3 has a plug opening 6 for the ends of the pin and/or contact sockets 3, and the compression element 4 is shown in section. In practice, they are realized, for example, as closed parts. Alternatively, the pin housing 3 or the socket housing can also consist of two shells, in particular two half-shells assembled to form a part.

In addition, it is conceivable to provide the pin housing 3 or the socket housing with an additional outer housing.

As an alternative to the illustration in FIGS. 1 and 2, a further latch element can also be inserted from the opposite side of the pin housing 3 or of the socket housing, Furthermore, it should be pointed out that the openings in the pin housing 3 or in the socket housing and/or in the latch elements (s) for the teeth 8 and/or the teeth 8 themselves can have bevels that, when the at least one latch element 5 is inserted into the pin housing 3 or into the socket housing, apply a force to the compression element 4 that affects either only the force for compression the seals 1 or is an additional force therefor.

LIST OF REFERENCE SIGNS

1 Seals
2 Contact pin
3 Pin housing
4 Compression element
5 Latch element
6 Plug-in opening
7 lateral projections
8 Comb finger
9 Press heads

The invention claimed is:

1. A plug connector comprising: contacts; a cable connected to the contacts; a housing formed with chambers each respectively receiving at least part of the contacts; and seals for longitudinally fixing the contacts in the housing, respectively surrounding each of the contacts in the chambers, and compressed between the housing and the contact; a compression element fixed in the housing and having a compression head compressing the seals; wherein two semicylindrically shell-shaped compression elements are provided that engage around the contact.

2. The plug connector according to claim 1, wherein the compression element is of semicylindrical shell-shape and the contact is fitted into a groove thereof.

3. The plug connector according to claim 1, further comprising a latch element supported on a pin housing or socket housing for fixing the compression element.

4. The plug connector according to claim 3, wherein the latch element is a comb having teeth in openings of the pin housing or socket housing into which the latch element can be fitted.

5. The plug connector of claim 1, wherein:

each of the seals is approximately cylindrical and made of an elastically yielding or deformable material; and the contacts comprise contact pins respectively fitted through passages of the seals.

6. A plug connector comprising:

a contact;

a cable connected to the contact;

a housing formed with a chamber receiving at least part of the contact;

a seal for longitudinally fixing the contact in the housing, surrounding the contact in the chamber, and compressed between the housing and the contact; and a latch element supported on a pin housing or socket housing for fixing a compression element;

wherein the latch element is a comb having teeth in openings of the pin housing or socket housing into which the latch element can be fitted; and wherein the contact includes lateral projections that can be supported on the teeth.

7. The plug connector according to claim 6, wherein the compression element has recesses complementary to the lateral projections and in which the lateral projections can be inserted.

8. The plug connector of claim 6, wherein the compression element has a semicylindrical shell-shape.

9. The plug connector of claim 6, wherein the compression element is fixed in the housing and has a compression head compressing the seals.

10. The plug connector of claim 6, wherein:

the seal is approximately cylindrical and made of an elastically yielding or deformable material; and the contact comprise a contact pin fitted through a passages of the seal.

11. A connector comprising:

a housing formed with a row of longitudinally rearwardly open chambers and with a longitudinally forwardly open plug opening;

contacts in the housing extending longitudinally rearward into the chambers and longitudinally forward into the plug opening;

seals respectively surrounding each of the contacts in the chambers;

a press element having press heads each bearing longitudinally forward on the seals and compressing same longitudinally so as to compress the respective seals transverse inward against the respective contacts and transversely outward against inner surfaces of the respective chambers; and a latch element releasably transversely engageable through the housing rearward of the press element and braced longitudinally forwardly against the press element and longitudinally rearwardly against the housing for longitudinally fixing the press element in the housing.

12. The connector of claim 11, wherein:

the latch element is a comb having teeth in openings of a pin housing or socket housing into which the latch element can be fitted; and the contacts include lateral projections that can be supported on the teeth.

13. The connector of claim 11, wherein the press element has a semicylindrical shell-shape.

14. The connector of claim 11, wherein:

each of the seals is approximately cylindrical and made of an elastically yielding or deformable material; and the contacts comprise contact pins respectively fitted through passages of the seals.

15. A method of assembling a plug connector having:

a housing formed with a row of longitudinally rearwardly open chambers and with a longitudinally forwardly open plug opening;

contacts;

seals;

a press element having a plurality of press heads; and a latch element, the method comprising the steps of:

inserting the contacts into the housing so they each extend longitudinally rearward into a respective one of the chambers and longitudinally forward into the plug opening;

fitting a respective one of the seals in each of the chambers around each of the contacts therein;

pushing the press heads longitudinally forward against the seals and thereby compressing same longitudinally so as to press the respective seals transverse inward against the respective contacts and transversely outward against inner surfaces of the respective chambers; and fitting the latch element transversely through the housing rearward of the press element and bracing the element longitudinally forwardly against the press element and longitudinally rearwardly against the housing so as to maintain the seals longitudinally compressed.

16. The method of claim 15, wherein:

the latch element is a comb having teeth in openings of a pin housing or socket housing into which the latch element can be fitted; and the contacts include lateral projections that can be supported on the teeth.

17. The method of claim 15, wherein the press element has a semicylindrical shell-shape.

18. The method of claim 15, wherein:

each of the seals is approximately cylindrical and made of an elastically yielding or deformable material; and the contacts comprise contact pins respectively fitted through passages of the seals.

* * * * *